US012617043B2

(12) United States Patent
Chai et al.

(10) Patent No.: US 12,617,043 B2
(45) Date of Patent: May 5, 2026

(54) BOTTOM OHMIC SILVER PASTE FOR STRONTIUM TITANATE RING VARISTOR, PREPARATION METHOD AND USE THEREOF

(71) Applicant: GUANGZHOU NEWLIFE NEW MATERIAL CO., LTD., Guangzhou (CN)

(72) Inventors: Zhinan Chai, Guangzhou (CN); Shuiming Zhou, Guangzhou (CN); Keqiang Wang, Guangzhou (CN); Xuezhao Wang, Guangzhou (CN)

(73) Assignee: GUANGZHOU NEWLIFE NEW MATERIAL CO., LTD., Guangzhou (CN)

( * ) Notice: Subject to any disclaimer, the term of this patent is extended or adjusted under 35 U.S.C. 154(b) by 508 days.

(21) Appl. No.: 18/132,362

(22) Filed: Apr. 7, 2023

(65) Prior Publication Data

US 2023/0321764 A1 Oct. 12, 2023

(30) Foreign Application Priority Data

Apr. 7, 2022 (CN) .......................... 202210353067.8

(51) Int. Cl.
| | |
|---|---|
| *B23K 35/02* | (2006.01) |
| *B23K 35/30* | (2006.01) |
| *B23K 35/36* | (2006.01) |
| *B23K 101/36* | (2006.01) |
| *H01C 1/144* | (2006.01) |
| *H01C 7/10* | (2006.01) |
| (Continued) | |

(52) U.S. Cl.
CPC ........ *B23K 35/025* (2013.01); *B23K 35/3006* (2013.01); *B23K 35/3602* (2013.01); *B23K 35/3607* (2013.01); *B23K 35/3613* (2013.01);

*H01C 1/144* (2013.01); *H01C 7/1006* (2013.01); *H01C 17/286* (2013.01); *B23K 2101/36* (2018.08); *H01C 7/123* (2013.01)

(58) Field of Classification Search
CPC .... H01C 1/144; H01C 7/1006; H01C 17/286; B23K 35/025; B23K 35/3006; B23K 35/3602; B23K 35/3607; B23K 35/3617
See application file for complete search history.

(56) References Cited

U.S. PATENT DOCUMENTS

| | | | | | |
|---|---|---|---|---|---|
| 2008/0254567 | A1* | 10/2008 | Konno | ..................... | H01B 1/16 |
| | | | | | 252/514 |
| 2013/0076225 | A1* | 3/2013 | Ito | ........................... | H01J 11/24 |
| | | | | | 313/352 |
| 2013/0099178 | A1* | 4/2013 | Hang | ....................... | H01B 1/22 |
| | | | | | 252/514 |

FOREIGN PATENT DOCUMENTS

| | | | | |
|---|---|---|---|---|
| CN | 1629986 | B | 4/2010 | |
| CN | 102855960 | B | 9/2015 | |
| CN | 107945909 | * | 4/2018 ............... H01B 1/16 |

OTHER PUBLICATIONS

CN-107945909 translation. (Year: 2018).*

* cited by examiner

*Primary Examiner* — Kyung S Lee

(57) ABSTRACT

The present invention provides a bottom ohmic silver paste for strontium titanate ring varistor including silver powder, doped $SnO_2$ micro powder, glass powder, organic solvent and organic binder, and the mass ratio of the silver powder, the doped $SnO_2$ micro powder, the glass powder, the organic solvent and the organic binder is 65-85:0.9-4.3:0.5-5:10-20: 10-15. The present invention also provides a preparation (Continued)

method and use of the bottom ohmic silver paste for stron-
tium titanate ring varistor of the present invention.

16 Claims, 4 Drawing Sheets

(51) Int. Cl.
    *H01C 7/12*          (2006.01)
    *H01C 17/28*         (2006.01)

Technical requirements

1、 E10=17-29v; 2、 a≥2.5; 3、 C≤50nF;
4、 K≤0.3%℃;

5, the bending strength is no less than 9.8N;
6, the peeling strength of silver layer is no less than 9.8N ;

7, the surface is flat and smooth 8, the silver is evenly coated;
9, material: strontium titanate.
wherein the unit of size is mm.

BOTTOM OHMIC SILVER PASTE FOR STRONTIUM TITANATE RING VARISTOR, PREPARATION METHOD AND USE THEREOF

CROSS-REFERENCE TO RELATED APPLICATION

The present application claims priority to Chinese patent application number CN 202210353067.8 filed on Apr. 7, 2022, the entire contents of which are hereby incorporated by reference.

FIELD OF THE INVENTION

The present invention generally relates to the field of semiconductor functional ceramics and, more particularly, relates to bottom ohmic silver paste for strontium titanate ring varistor, preparation method and use thereof.

BACKGROUND OF THE INVENTION

Strontium titanate varistor is made from strontium titanate. After molding and discharging glue, due to the combined action of donor doping and reduction atmosphere sintering, the grain and the semifinished product are semiconductive. Due to the combined action of donee doping and high temperature oxidation, the high resistance insulation of the surface layer of the grain boundary and the substrate is realized, to obtain a kind of surface layer semiconductor substrate. After screen printing and electrode sintering, a semiconductor ceramic sensor with both nonlinear volt-ampere characteristics and capacitive characteristics is finally fabricated.

After high temperature oxidation treatment, the surface of strontium titanate ceramics has an oxygen adsorption layer, which is a high resistance insulating layer. Silver is a stable noble metal. The electrode formed by sintering and infiltration of the pure silver paste and the high resistance layer on the surface of the strontium titanate semiconductor ceramic substrate cannot form ohmic contact. To form ohmic contact, the preparation of the silver electrode for the strontium titanate ring varistor includes the printing of the bottom layer of ohmic paste and the printing of the surface layer of the silver paste. The ohm paste is the silver paste containing metals having strong reducibility, for example, metal powders such as zinc, aluminum and nickel, in which the content of the reductive metal powder is about 15-40%. The surface layer of the silver paste is a pure silver paste having 70%-80% silver.

Although the addition of strong reducibility metal powder in the silver paste can form desirable ohmic contact between the electrode and the substrate, the micron-sized metals zinc, aluminum and nickel are very easy to be oxidized in high temperature air. Therefore, the sintering temperature of the strontium titanate ring varistor electrode can only be controlled in the range of 550° C.-620° C. Higher sintering temperature may cause the reductive metal in ohmic silver paste be oxidized and the ohmic characteristics will be lost. In addition, the nonlinear volt-ampere characteristics of the strontium titanate ring varistor cannot play the role while paralleled with the DC micro motor. Therefore, the surface layer silver electrode cannot form a dense silver layer because the sintering temperature cannot be raised, and the electrode welding performance of the strontium titanate ring varistor is not ideal. In the assembly of micro-motor welding, the problem of burning the electrode or unable to coating tin onto the electrode often occurs. With the rapid development of modern, efficient and rigorous welding technology, such as high frequency welding and laser welding, the requirement of high temperature resistance for the weldability of varistor electrode is more and more strict. Many manufacturers of strontium titanate ring varistor increases the thickness of silver layer by printing multi-layer silver paste to solve the problem of poor welding of silver electrode of varistor, which will increases the production and material cost of varistor.

CN102855960B discloses a method for preparing ohmic silver paste for use in SrTiO$_3$ varistor, including the steps of: mixing silver powder, aluminum powder or zinc powder, glass powder, organic binder and grinding; adding diluent and stirring evenly to obtain the ohmic silver paste for SrTiO$_3$ varistor. The method of CN102855960B can overcome the problems of poor ohmic contact and poor sintering performance of the domestic paste at present. The comprehensive performances of the ohmic silver paste according to CN102855960B are almost the same as those of foreign products. However, the method of CN102855960B cannot meet the requirement of high temperature welding.

CN1629986B discloses a strontium titanate ring varistor having copper electrode, which can overcome the volatilization phenomenon of silver and has better welding performance. However, the strontium titanate ring varistor having copper electrode of CN1629986B cannot withstand the laser welding.

One object of the present invention is to improve the high temperature resistance welding of the strontium titanate ring varistor electrode under the condition that the good ohmic contact and the resistivity of the silver electrode itself must be as small as possible, to solve the problem of burning silver electrode and unable to coating tin on the electrode in welding of SrTiO$_3$ varistor.

The addition of highly reductive metals such as zinc to the strontium titanate silver paste was replaced by doped tin dioxide SnO$_2$ micro powder in order to overcome the problem that the stability of pure silver cannot form ohmic contact on the surface of the high-resistance layer of the ring varistor having volt-ampere characteristics. The above practice cannot be found in prior art yet.

Additional definitions and descriptions of the relevant descriptions in the technical solution:

Welding refers to the welding of the wire of the armature winding of the DC motor onto the surface electrode of the strontium titanate ring varistor during the installation of the ring varistor.

Enduring welding and easy welding means the welding can be completed in a shorter time and at a higher temperature than in the prior art, and the welding can withstand a temperature of 380-420° C. which is higher than the conventional welding temperature of 350-380° C. for many times, so as to meet the modern, efficient, strict welding requirements of high frequency welding or laser welding.

The screen printing is the screen printing as same as that in the prior art, and the reducing atmosphere refers to hydrogen or nitrogen-hydrogen mixed atmosphere.

The ohmic contact between the electrode and the strontium titanate ring varistor means that the resistance between the two contact surfaces is a pure resistance constant, and its resistance value is not affected by position, current direction, and welding factors. The smaller the resistance value, the better. The existence of the resistance value does not affect the nonlinear volt-ampere characteristics of the strontium titanate ring varistor itself.

The nonlinear volt-ampere characteristics of the strontium titanate ring varistor substrate can be approximately expressed by the following formula:

$$I=(U/C)^\alpha$$

In the formula, I is the current flowing through the ring varistor, U is the voltage at two ends of the ring varistor, C is the material constant, a is the nonlinear coefficient and greater than 1, in which a can be expressed by the following formula:

$$\alpha=1/1g(E_{10}/E_1)$$

E1, E10 are the voltage of the ring varistor when current flowing through the strontium titanate ring varistor is 1 mA, 10 mA.

Term [65, 85] represents a collection of real numbers, including the two end values of 65 and 85.

SUMMARY OF THE INVENTION

In view of the foregoing, one object of the present invention is to provide bottom ohmic silver paste for strontium titanate ring varistor and preparation method thereof, which can ensure desirable ohmic contact between the electrode and strontium titanate varistor substrate and resistance of the—sintered electrode is a constant as small as possible, to meet the strict requirement of laser and high frequency welding and improve the efficiency of conventional micro-motor welding.

According to one embodiment of the present invention, a bottom ohmic silver paste includes silver powder, doped tin dioxide $SnO_2$ micro powder, glass powder, organic solvent and organic binder, and a mass ratio of the silver powder, the doped tin dioxide $SnO_2$ micro powder, the glass powder, the organic solvent and the organic binder is 65-85:0.9-4.76:0.5-5:10-20:5-15.

According to one aspect of the present invention, the doped tin dioxide $SnO_2$ micro powder is tin dioxide $SnO_2$ micro powder doped with one or two of antimony, fluorine, and phosphorus and tungsten ions.

According to one aspect of the present invention, the doped tin dioxide $SnO_2$ micro powder is doped with $Sb_2O_3$.

According to one aspect of the present invention, a mass ratio of tin dioxide $SnO_2$ to dopant in the doped tin dioxide $SnO_2$ micro powder is 89-99:1-11, in which sum of mass ratio of the tin dioxide $SnO_2$ micro powder and the dopant is 100.

According to one aspect of the present invention, the doped tin dioxide $SnO_2$ micro powder is spherical and has a median granularity D50 of 0.5-3 μm.

According to one aspect of the present invention, the doped tin dioxide $SnO_2$ micro powder has a specific surface area of 2-50 m2/g and a resistivity of 0.1-1 Ω·cm at room temperature.

According to one aspect of the present invention, a method for preparing the glass powder includes the steps of: mixing $H_3BO_3$, $SiO_2$, $BaCo_3$, ZnO, $Al_2O_3$, $Na_2CO_3$, $K_2CO_3$ at a mass ratio of 20-60:15-25:10-20:15-20:1-10:5-20:1-10 via ball milling and obtaining a mixture; melting the mixture at 1250° C. for 2-3 h and obtaining glass slag via water-quenched after melting; placing the glass slag into a ball milling tank and carrying out ball milling for 4-24 h; and obtaining the glass powder with softening point of 635-700° C. and median granularity of D50≤3 μm after sieving and drying.

According to one aspect of the present invention, the silver powder includes a spherical silver powder A having a particle size of 1.0-2.5 μm, a spherical silver powder B having a particle size of 0.8-1.0 μm and a spherical silver powder C having a particle size of 0.2-0.8 μm, and a mass ratio of spherical silver powder A:spherical silver powder B:spherical silver powder C is 30-60:20-30:5-10.

According to one aspect of the present invention, a method for preparing the organic binder includes the steps of: accurately weighing at least one of 80-90 mass parts terpineol and butyl carbitol and adding the terpineol and/or butyl carbitol into a glue making machine, and heating the terpineol and/or butyl carbitol to 80° C.; adding 10-20 mass parts of ethyl cellulose, and controlling the temperature at 90-95° C.; fully stirring the mixture to form a transparent gelatinous mixture; and cooling the mixture naturally to room temperature in a plastic or stainless steel drum, to obtain the organic binder having a viscosity of 400-600 dPa·S.

According to one aspect of the present invention, the organic solvent is one or two of terpineol, butyl carbitol, dibutyl phthalate.

According to one aspect of the present invention, a method for preparing the bottom ohmic silver paste includes the steps of: mixing the silver powder, the doped tin dioxide $SnO_2$ micro powder, the glass powder, the organic solvent and the organic binder at a mass ratio of 65-85:0.9-4.76:0.5-5:10-20:5-15 to obtain a mixture; ball milling the mixture and rolling the mixture to obtain the bottom ohmic silver paste.

According to one aspect of the present invention, the bottom ohmic silver paste is printed on a surface of a high resistance layer of a strontium titanate substrate having nonlinear volt-ampere characteristics, and the bottom ohmic silver paste is sintered in air at a sintering temperature of 800-860° C.

According to one embodiment of the present invention, a method for improving easy welding and enduring welding performances of strontium titanate ring varistor includes the steps of: screen printing a bottom ohmic silver paste on a substrate of strontium titanate ring varistor having volt-ampere characteristics and drying, screen printing surface layer of silver paste in the same position again and drying; sintering the substrate with bottom ohmic silver paste and surface layer of silver paste in the air to form silver electrode, wherein the bottom ohmic silver paste is the bottom ohmic silver paste for strontium titanate ring varistor of the present invention.

According to one aspect of the present invention, a method for preparing the strontium titanate ring varistor substrate includes the steps of: mixing $SrCO_3$, $BaCO_3$, $CaCO_3$ and $TiO_2$ proportionally proportioned to obtain a mixture; ball-milling and drying the mixture, to solid-state synthesize strontium barium calcium titanate powder; doping one or more of $Nb_2O_5$, $La_2O_3$, $Ta_2O_5$ and $SiO_2$, $MnCO_3$ to prepare ceramic body of strontium barium calcium titanate ring varistor by ball milling, granulation and molding; and obtaining strontium titanate substrate having nonlinear volt-ampere characteristics by discharging glue, reduction sintering and oxidation sintering.

According to one aspect of the present invention, the surface layer silver paste is a silver conductive paste having a silver content of 70-80 percentages.

According to one embodiment of the present invention, a ring varistor with easy welding and enduring welding performances is prepared by the method for improving easy welding and enduring welding performances of strontium titanate ring of the present invention.

According to the technical solution of the present invention, the sintering is carried out in air at the temperature of 800-860° C. The bottom layer of ohmic silver paste has tin dioxide $SnO_2$ micro-powder doped with $Sb_2O_3$. Although the Sb ion has changing valence during the sintering process of the silver electrode, it cannot be confirmed that one or more of them coexist from $Sb_2O_3$ to $Sb_2O_4$ and $Sb_2O_5$. However, it can be known from the fact that all the electrical characteristics of the strontium titanate ring varistor made in the embodiment can meet all the technical requirements of the varistor, under the applied voltage of DC micro motor, sufficient carrier concentration migration overcomes the high resistance layer on the surface of strontium titanate substrate, which cannot be surmounted by the silver electrode conductor alone, ohmic contact is formed. Therefore, the voltage stability is good, and the difference of three-pole is small. Voltage change in positive and negative direction is small. Voltage change rate before and after welding is small. Voltage consistency between different individuals is good, referring to Tables 2 and 3.

Due to the difference of the sintering temperature of the electrode, the surface of the silver electrode of Comparative Example 1 in the prior art is far inferior to the present invention in luster, density and flatness, because the electrode sintering temperature of Comparative Example 1 can only be controlled in the range of 550° C.-620° C. Although the micron-sized metal zinc, copper, aluminum and nickel are wrapped and infiltrated by organic bonding paste and glass paste, with the increase of sintering temperature, the organic components in the paste evaporate, and the glass paste is combined on the substrate. At this moment the micron-sized metal zinc, copper, aluminum and nickel are easily oxidized in the air at high temperature. If the temperature is higher than 750° C., the ohm contact effect will be worse. According to the technical solution of the present invention, the silver electrode is doped with oxide, and sintered in air at 800-860° C. The surface of the silver electrode is more delicate and compact, it can avoid the tiny holes in the conventional 550° C.-620° C. sintered electrode which can weaken the soldering firmness, save the welding time of the conventional electrode and reduce the thickness of the electrode. At the same time, the adhesion effect with the substrate is better, to meet the requirement of electrode peeling strength and cannot be blackened by friction during sorting, testing and welding process, which can provide guarantee for electrode's enduring welding, easy welding and laser welding.

The silver electrode sintering and permeating process according to the present invention does not need the protection of nitrogen-filled atmosphere as used in copper electrode sintering and permeating process, which can save the cost.

The tin dioxide $SnO_2$ micro powder doped with $Sb_2O_3$ in Examples 1-10 of the present application is safe, easy to implement in mass production, and does not increase production cost.

The voltage of the strontium titanate varistor in the prior art is derived from the oxidation sintering process of the strontium titanate substrate. According to the present invention, the oxidation time of the substrate in the range of the same target voltage E10 value is shorter than that of the comparative example. It is obvious that the silver electrode sintering process contributes a part of the voltage value of the E10 to the target value, which is an unexpected breakthrough to the conventional technological process, not only saves the manufacturing process energy consumption, but also contribute to improvement of E10 voltage of strontium titanate ring varistor, breaking through the existing E10 value, as shown in Table 4.

BRIEF DESCRIPTION OF THE DRAWINGS

In order to better illustrate the technical solution of the present invention, the present invention will be described in detail in view of the examples and the attached drawings. All the specific parameters and descriptions of the examples of the present invention are used for better illustration only, not for limitation of the present invention. Any replacement, recombination, deletion or addition that does not exceed the expected effect of the technical solution will fall within the scope of protection of the present invention.

Figure 3:
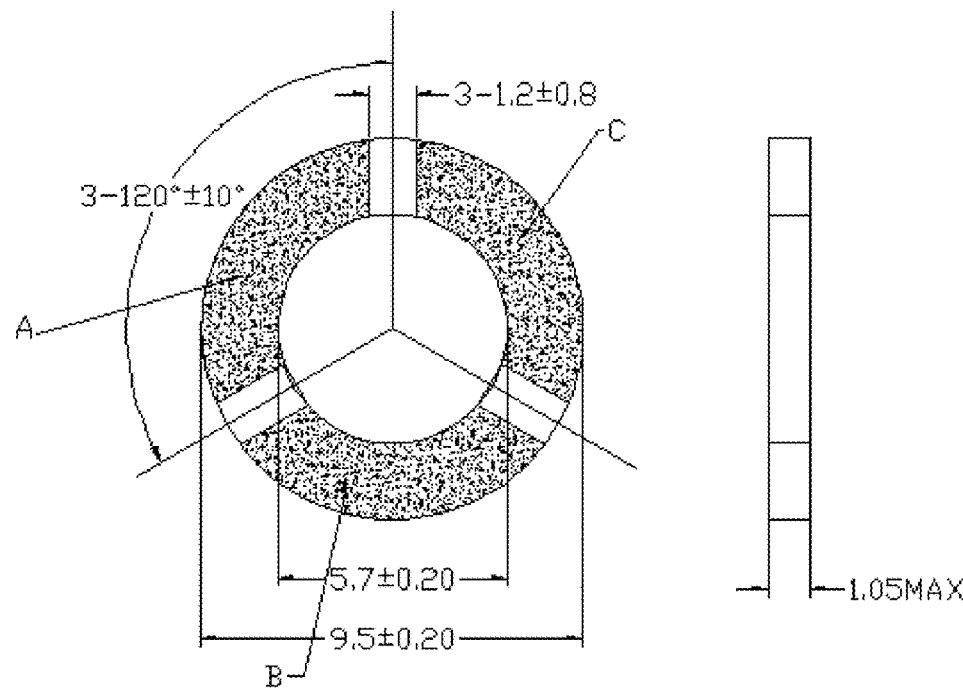

FIG. 3 are top view and side view of a flat-laid strontium titanate ring varistor of conventional specification, in which, three silver electrodes A, B and C are sintered and permeated on the substrate plane of strontium titanate ring varistor with nonlinear volt-ampere characteristics. The size of the substrate is $\varphi 9.5 \pm 0.20 \times \varphi 5.7 \pm 0.20 \times 1.05$ max in mm, and the technical requirement was E10=17-29V; $\alpha$ value$\geq 2.5$; C$\leq 50$ nF; K$\leq 0.3\%/°$ C.; the breaking strength$\geq 9.8$N; silver peel strength$\geq 9.8$N; surface smoothness and even silver coating. The wires of an armature winding of the DC micro-motor will be welded to the adjacent electrodes of the same varistor respectively. When the motor runs, the ring varistor will be in parallel with one winding of the DC motor in turn, which can absorb the high frequency instantaneous back electromotive force due to motor commutating, eliminate electric spark, reduce noise and reduce electromagnetic interference. The technical solution according to the present invention covers all series specifications of strontium titanate ring varistor, such as the number of electrodes including 3,5,6, 10,12, etc. The position can be one of upper and lower end faces, inner and outer side faces, and different combinations of the above. The voltage E10 ranges from specifications of 1.5 to 3.5V to specifications of 60 to 100, the size ranges from $\Phi 2.5 \pm 0.10 \times \varphi 1.75 \pm 0.05 \times 0.45$max to $\Phi 23.00.0.50 \times \Phi 15.10.0.50.1.90$max, as shown in FIG. 3.

Figure 4:
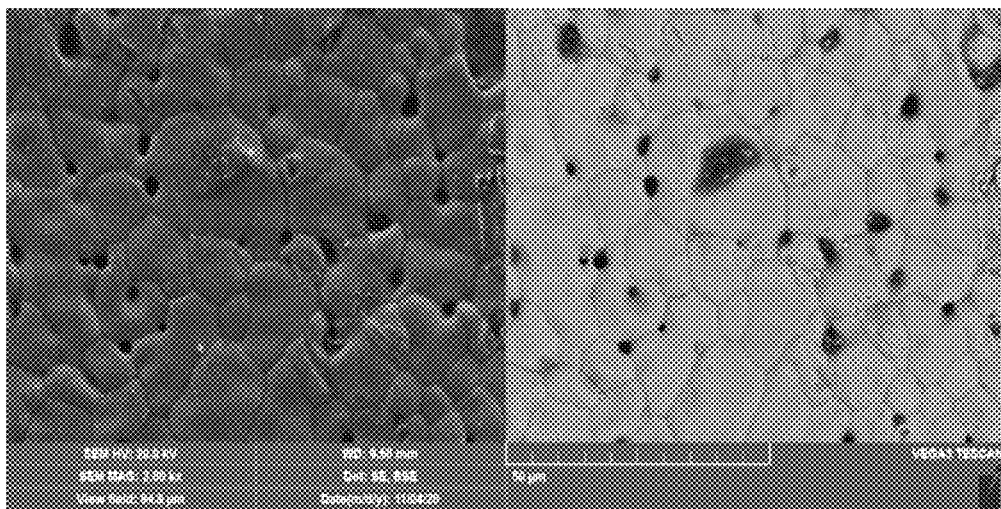
Figure 5:
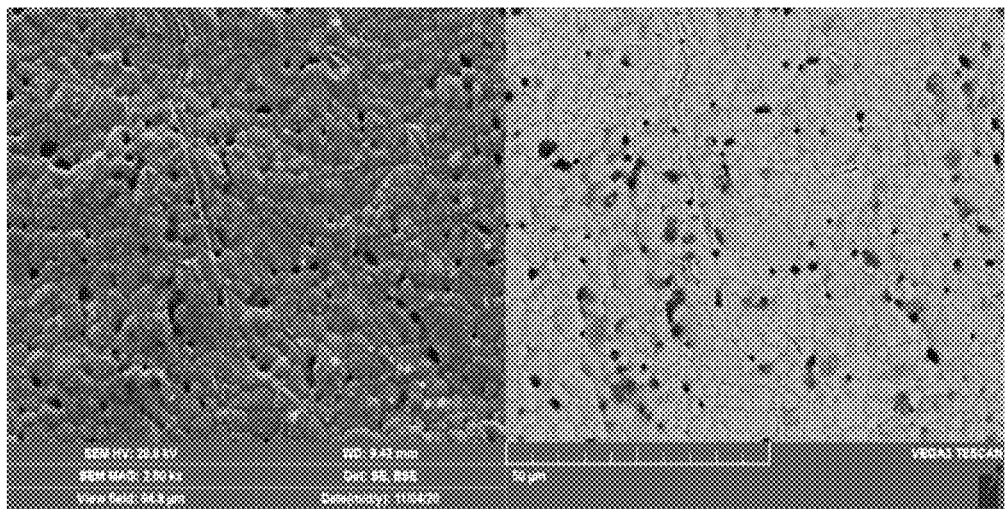

FIG. 4 is a scanning electron microscope (SEM) diagram of the electrode surface of one of the products in Example 2 of the present invention;

FIG. 5 is a scanning electron microscope (SEM) diagram of the electrode surface of one product in the Comparative Example 1 in the prior art:

2.88:19:4.8 to obtain a mixture; placing the mixture in a ball-mill can and mixing and ball milling the mixture for 4 h-24 h; after ball milling, placing the mixture in an alumina crucible and melting in a high temperature of 1250° C. in muffle stove for 2-3 h; obtaining glass slag by water quenching after melting; putting the glass slag into a ball mill can and ball milling the glass slag with deionized water as the ball mill medium for 12-24 h; after sieving and drying, obtaining the glass powder with softening point of 650° C. and median granularity of D50$\leq 3$ μm.

Wherein the silver powder includes spherical silver powder A having particle size of 1.0-2.5 μm, spherical silver powder B having particle size of 0.8-1.0 μm, and spherical silver powder C having particle size of 0.2-0.8 μm, and the mass ratio of spherical silver powder A:spherical silver powder B:spherical silver powder C is 60:20:10.

Wherein the organic solvent is mixture of terpineol and butyl carbitol and the weight ratio of terpineol to butyl carbitol is 7:3.

The method for preparing organic binder includes the steps of adding 40 wt. % terpineol, 40 wt. % butyl carbitol into glue making machine and heating to 80° C.; weighting and adding 20 wt. % ethyl cellulose, and stirring for 2 h at 90° C. to form a transparent gelatinous mixture; placing transparent gelatinous mixture in a stainless steel drum and cooling to room temperature, to obtain an organic binder having a viscosity of 450 dPa·S.

Wherein the doped tin dioxide $SnO_2$ micro powder is spherical, the median granularity D50 is 0.5-3 μm, the specific surface area is 2-50 m2/g, the resistivity is 0.1-1 $\Omega$·cm, the doped material is $Sb_2O_3$ and a mass ratio of $SnO_2$:$Sb_2O_3$ is shown in Table 1.

TABLE 1

| Mass ratio of $SnO_2$:$Sb_2O_3$ in the Examples | | | | | | | | | | |
|---|---|---|---|---|---|---|---|---|---|---|
| Mass | Examples | | | | | | | | | |
| ratio % | 1 | 2 | 3 | 4 | 5 | 6 | 7 | 8 | 9 | 10 |
| $SnO_2$ | 89 | 90 | 91 | 92 | 93 | 94 | 95 | 97 | 98 | 99 |
| $Sb_2O_3$ | 11 | 10 | 9 | 8 | 7 | 6 | 5 | 3 | 2 | 1 |
| Total | 100 | 100 | 100 | 100 | 100 | 100 | 100 | 100 | 100 | 100 |

Figure 6:
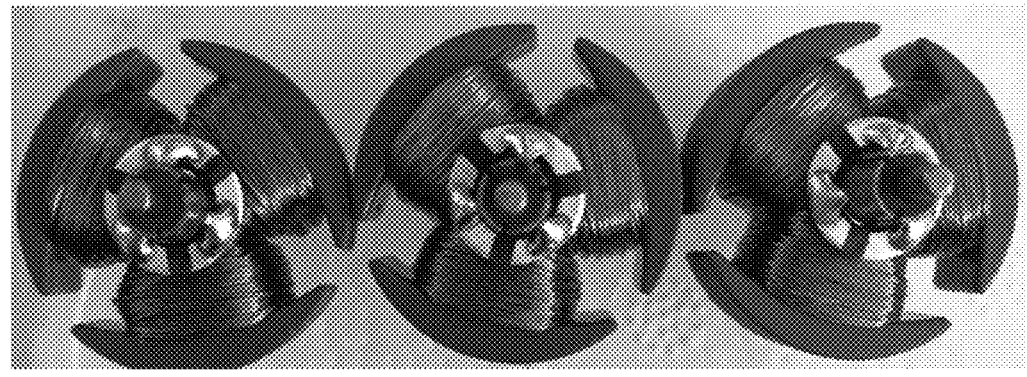
Figure 7:
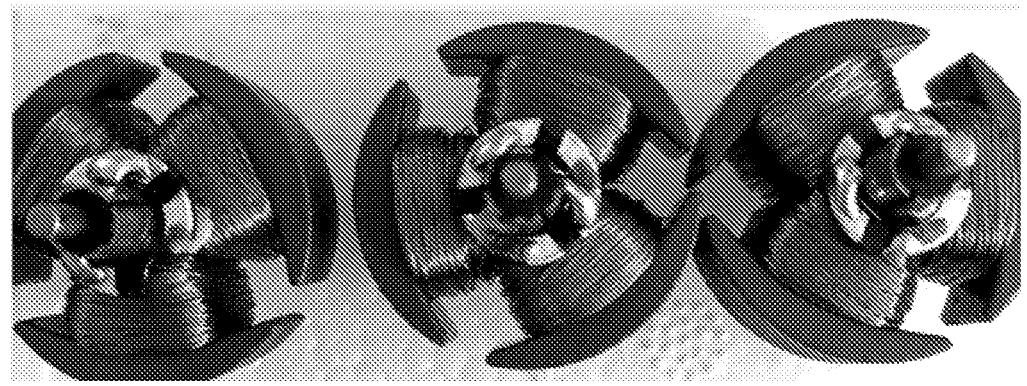
Figure 8:
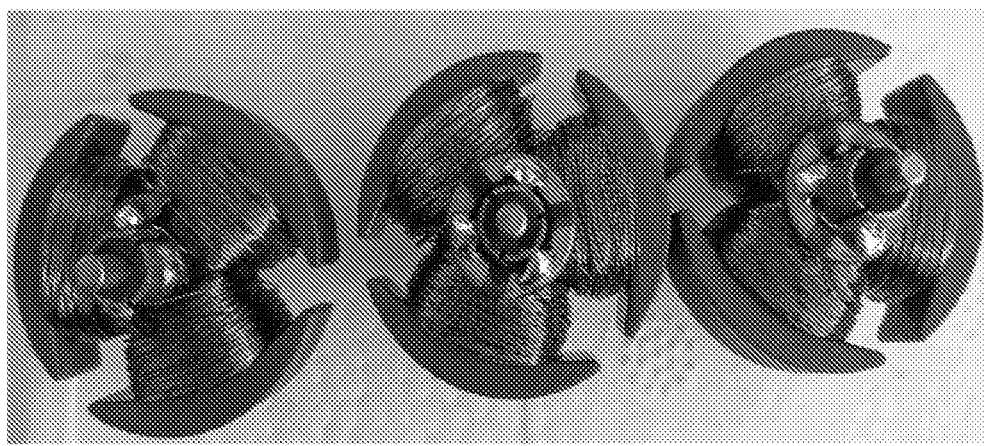

FIG. 6 is an electrode photograph of the results in sequence after laser welding of one of the products in Examples 2. 7 and 9 of the present invention;

FIG. 7 is three electrode photos randomly selected from the products after laser welding of Comparative Example 1;

FIG. 8 is three copper electrode photos randomly selected from the products after laser welding of Comparative Example 2.

DETAILED DESCRIPTION OF THE INVENTION

A bottom ohmic silver paste for strontium titanate ring varistor includes silver powder, doped tin dioxide $SnO_2$ micro powder, glass powder, organic solvent and organic binder, and a mass ratio of the silver powder, the doped tin dioxide $SnO_2$ micro powder, the glass powder, the organic solvent and the organic binder is 75:1.125:5:10:10.

Figure 1:
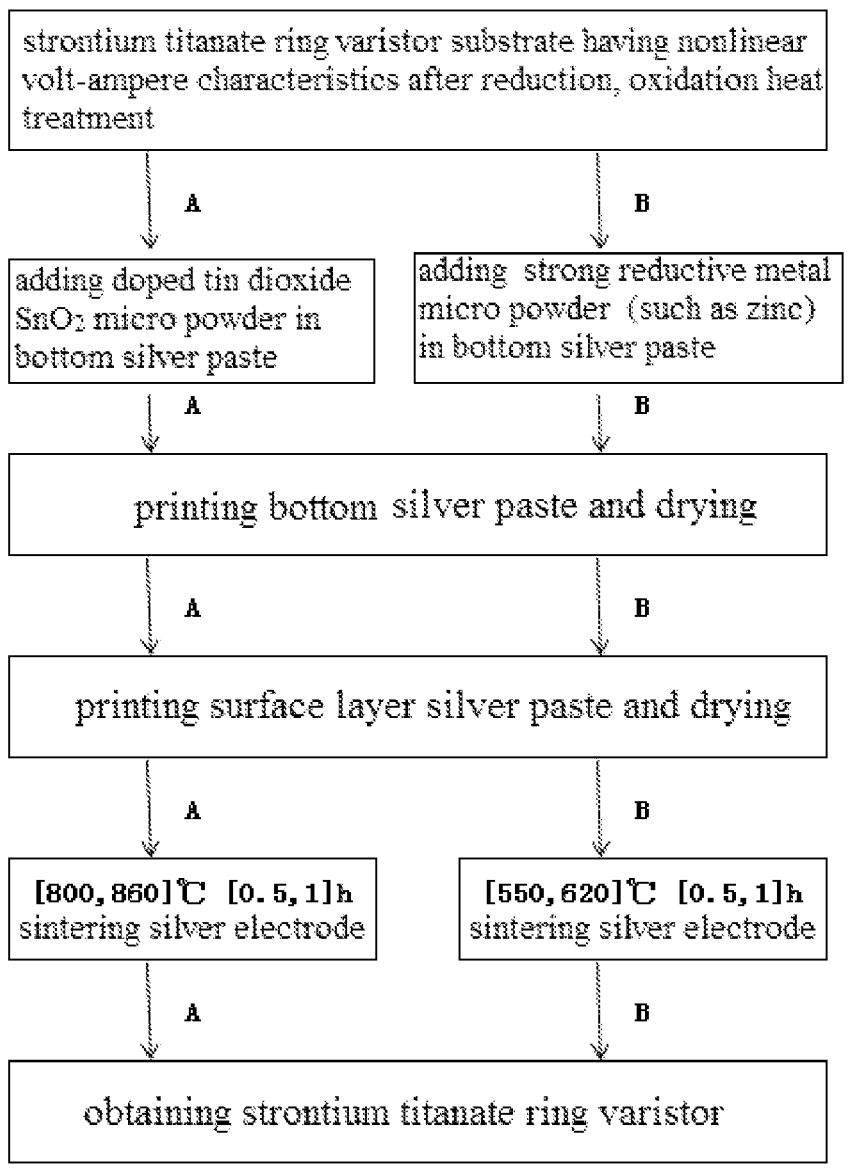
FIG. 1 is a comparison of progress flow in the prior art and the process flow of the present invention, wherein process flow branch A shows the unique process steps of the present invention, wherein the bottom ohm silver paste contains doped tin dioxide $SnO_2$ micro powder, and the silver layer is sintered and permeated at 800-860° C. for 0.5-1 hours; process flow branch B is the process flow in the prior art, wherein the bottom ohmic silver paste having one of the conventional additives of the strong reductive metals Zn, Ni, Al and Cu, and the silver layer is sintered and permeated at 550-620° C. for 0.5-1 hours.

The method for preparing the glass powder includes the steps of: mixing $H_3BO_3$. $SiO_2$. $BaCO_3$, ZnO, $Al_2O_3$, $Na_2CO_3$, $K_2CO_3$ according to a mass ratio of 20:20:14:19:

As shown Branch A in FIG. 1 of the process flow chart, the present invention provides a method for preparing a strontium titanate ring varistor, wherein the method for preparing the bottom silver paste includes the steps of:

Preparing the bottom ohmic silver paste:adding the silver powder, the doped tin dioxide $SnO_2$ micro powder, the glass powder, the organic solvent and the organic binder at a mass ratio of 75:1.125:5:10:10 in the ball mill can and ball milling for 15-16 hours; and rolling the slurry by three rollers 3-4 times to get the bottom ohm silver paste.

The bottom ohmic silver paste prepared by the above method is screen-printed through 180 meshes on the substrate of strontium titanate ring varistor having non-linear volt-ampere characteristics as shown in FIG. 3, and dried at 150-200° C. At the same position, the surface layer of silver paste was screen printed through 250 meshes once again and dried at 180-220° C., and the strontium titanate substrate screen printed with silver paste was put into the mesh belt furnace and sintered at 800-860° C. in the air for 0.5-1 hour.

The method for preparing the strontium titanate ring varistor substrate includes the following steps: preparing solid-state synthesis of strontium barium calcium titanate powder via mixing $SrCO_3$, $BaCO_3$, $CaCO_3$ and $TiO_2$ proportionally proportioned to obtain a mixture, ball milling the mixture, and drying, sintering; doping one or more of $Nb_2O_5$, $La_2O_3$, $Ta_2O_5$ and $SiO_2$, $MnCO_3$ to prepare the ceramic body of strontium barium calcium titanate ring varistor by ball milling, granulation and molding; and obtaining strontium titanate ring varistor substrate with nonlinear volt-ampere characteristics by discharging glue, reduction sintering and oxidation sintering.

The surface layer silver paste is silver conductive paste having silver content of 75 percentages.

A ring varistor with easy welding and enduring welding performances of the specification shown in FIG. 3 is produced by the method described above for improving the performance of easy welding and enduring welding of a strontium titanate ring varistor.

The test of the above-mentioned properties and the comparison of the relevant process parameters of the strontium titanate ring varistor are shown in Tables 2, 3, 4.

According to the ratio 95:5 of $SnO_2$:$Sb_2O_3$, the doped tin dioxide $SnO_2$ micro powder to silver powder was added according to Table 5, a bottom ohmic silver paste for a strontium titanate ring varistor is prepared as in the above embodiment. The silver paste obtained is printed on the surface of a high resistance layer with a non-linear volt-ampere varistor substrate of FIG. 3, after drying and reprinting the silver paste on the surface, drying and sintering, the relative parameters of ohmic contact performance were tested under the same conditions as above. The results shows that the three-pole difference E1 value is no more than 1.0V, and the E10 value is no more than 1.5V. The positive and negative voltage variations are no more than 0.3V. Rate of change of voltage E1 and E10 values before and after welding is no more than 6.5%, still within the voltage range specified in FIG. 3, meeting the ohmic contact requirements.

TABLE 5

| Mass percent of doped tin dioxide $SnO_2$ micro powder in the silver powder | | | | |
|---|---|---|---|---|
| 1.5 | 2.5 | 3.5 | 4.5 | 5.0 |

Note:
1.5 percent corresponding to 75:1.125 of step 2 in the Example

Comparative Example 1

As shown in Branch B of the process flow chart of FIG. 1, a conventional method for preparing strontium titanate ring varistor in which the bottom ohmic silver paste is a commercially available silver paste having a silver content of 55%. The reductive metal powder, such as zinc, aluminum and nickel, added into to silver paste is about 15-40%.

As shown in FIG. 3, a conventional bottom ohmic silver paste was screen-printed on a volt-ampere strontium titanate ring varistor substrate through a 180 meshes wire mesh and dried at 150-200° C. The surface layer silver paste was printed on the same position by a 250 meshes wire mesh and dried at 180-220° C. The strontium titanate substrate with silver paste was put into the mesh belt furnace and sintered at 600° C. for 0.5-1 hour.

The surface layer silver paste is a silver conductive paste on the market containing 75% silver.

Comparative Example 2

Copper electrode ring varistor on the market has the size and voltage specifications as shown in FIG. 3.

Comparative Example 3

The difference between Comparative Example 1 and Comparative Example 3 lies in that, there is no printing of the conventional bottom layer ohmic silver paste of the prior art.

Test of examples and three comparative examples
Table 2 and Table 3 show the comparison of ohmic characteristics, wherein the data recorded in the tables are the average values of 20 pcs selected from each 500 pes basic.
Table 4 is a recorded parameters comparison of relevant preparation process.
Analysis of Test Results 1
The results in Tables 2 and 3 show that the ohmic contact is realized between the electrode and the strontium titanate ring varistor substrate, such as the three-pole voltage change rate before and after welding, three-pole difference, positive and negative current difference, a value, all of them can meet the requirements of the electrical performance of the varistor when the motor is in use. The non-linear volt-ampere characteristics of strontium titanate ring varistor can be performed normally, which is comparable to the ohmic contact characteristics of the prior art of adding a highly reducing metal to the silver paste as a base layer of ohmic silver paste in Comparative Example 1. The typical defects of non-ohmic contact that occur in Comparative Example 3 are overcome. All the examples can realize the functions of high-frequency transient overvoltage protection, absorbing the electric spark generated by commutator, making the motor quiet, reducing electromagnetic interference when the DC micro-motor operates, and the peeling strength of silver layer also meet actual requirements. It can be concluded that the ratio after 89:11 will worsen the relevant parameters.

TABLE 2

| | | Voltage record and change rate thereof before and after welding (specifications in FIG. 3) | | | | | | |
|---|---|---|---|---|---|---|---|---|
| | $SnO_2$:$Sb_2O_3$ | | | E1 | | | E10 (17-29 V) | |
| | added | Item tested | A-B | B-C | C-A | A-B | B-C | C-A |
| Example 2 | 90:10 | before welding | 18.32 | 18.39 | 18.48 | 27.32 | 27.28 | 27.56 |
| | | after welding | 17.36 | 17.30 | 17.46 | 26.04 | 25.81 | 25.81 |
| | | change rate % | −5.25 | −5.90 | −5.52 | −4.70 | −5.42 | −6.34 |
| Example 7 | 95:5 | before welding | 13.91 | 13.97 | 13.95 | 20.92 | 20.95 | 20.94 |
| | | after welding | 13.91 | 14.01 | 13.97 | 20.91 | 21.00 | 20.97 |
| | | change rate % | −0.01 | 0.30 | 0.14 | −0.08 | 0.24 | 0.13 |

TABLE 2-continued

| | | | Voltage record and change rate thereof before and after welding (specifications in FIG. 3) | | | | | |
| | SnO$_2$:Sb$_2$O$_3$ | | E1 | | | E10 (17-29 V) | | |
| | added | Item tested | A-B | B-C | C-A | A-B | B-C | C-A |
|---|---|---|---|---|---|---|---|---|
| Example 9 | 98:2 | before welding | 16.20 | 16.06 | 16.43 | 23.59 | 23.36 | 24.02 |
| | | after welding | 16.22 | 15.86 | 16.20 | 23.50 | 23.18 | 23.78 |
| | | change rate % | 0.11 | −1.27 | −1.41 | −0.40 | −0.76 | −1.00 |
| Comparative | No | before welding | 12.74 | 12.72 | 12.64 | 20.49 | 20.43 | 20.26 |
| Example 1 | | after welding | 12.87 | 12.82 | 12.72 | 20.56 | 20.43 | 20.34 |
| | | change rate % | 1.02 | 0.76 | 0.64 | 0.34 | 0.03 | 0.42 |
| Comparative | No | before welding | 46.89 | No | No | 62.57 | 63.35 | 54.16 |
| Example 3 | | after welding | 28.58 | No | No | 46.72 | No | No |
| | | change rate % | −39.05 | No | No | −25.33 | No | No |

In examples 2, 7 and 9, the capacity at 1.0 KHz is larger than 13.325 nF, and the peeling strength of silver layer is larger than 36N.

Note:

"no" in the table means the data is not detected because the voltage between A and B is enough to explain the problem.

(specifications in FIG. 3)

| | SnO$_2$:Sb$_2$O$_3$ | E1 | E10 | A-B | B-C | C-A | E1 | E10 | E1 | E10 | E1 | E10 |
|---|---|---|---|---|---|---|---|---|---|---|---|---|
| Example 2 | 90:10 | 0.90 | 1.48 | 5.76 | 5.84 | 5.76 | 18.32 | 27.32 | 18.34 | 27.06 | −0.02 | 0.27 |
| Example 7 | 95:5 | 0.41 | 0.54 | 5.64 | 5.69 | 5.67 | 13.97 | 20.95 | 14.03 | 21.01 | −0.06 | −0.06 |
| Example 9 | 98:2 | 0.89 | 1.37 | 6.12 | 6.15 | 6.07 | 16.20 | 23.59 | 16.34 | 23.74 | −0.14 | −0.15 |
| Comparative Example 1 | no | 0.33 | 0.53 | 4.84 | 4.86 | 4.88 | 12.72 | 20.43 | 12.74 | 20.40 | −0.02 | 0.03 |
| Comparative Example 3 | no | no | 15.47 | 21.35 | no | no | 46.89 | 62.57 | 47.41 | 61.69 | 9.32 | 7.34 |

Note:

three-pole difference in the table equals the maximum in A-B, B-C, C-A three-electrode voltage minus the minimum in A-B, B-C, C-A three-electrode voltage.

Analysis of Test Results 2

Referring to the scanning electron microscope in FIGS. 4 and 5, compared with the electrode in the Comparative Example 1, we can clearly find that the grain size of the electrode of the present invention in FIG. 4 is larger and the voids are less after the electrode is sintered and permeated, the surface is smoother, flatter and has more luster. Under the same welding condition, the soldering tin of the electrode will achieve better level adhesion effect, easy welding and enduring welding. It can be welded for 2 s at 400° C., and can be repeated for 4 times. It can undergo laser welding, and can reduce the probability of silver electrode surface blackening in the process of process flow. FIG. 4 only shows one of the scanning electron microscope of Example 2, the electrodes in Examples 1-10 have the same effect.

Analysis of Test Results 3

It is found that the electrode in FIG. 6 of the present invention can keep its luster after being welded by laser, and the soldering tin can infiltrate and level on the electrode normally. FIG. 7 of Comparative Example 1 shows the phenomenon of "burning silver", "unable to coating tin", unable to withstand laser welding, electrode and solder have burst phenomenon, exposed strontium titanate substrate, all of the above occur in the prior art. In FIG. 8, copper electrode is also unable to withstand laser welding. Each of the three photos shows that the solder and the electrode are missing.

Analysis of Test Results 4

Analyzing the data in Table 4, to realize the E10 value of 17-29V of the same specification, the oxidation time of the substrate in Examples 1-10 only needs 4.5 h, which saves more than 50% oxidation time relative to that of the substrate in the prior art, thereby saving the oxidation cost. Same oxidation temperature and oxidation time of 9.5 h, the E10 value of the present invention reaches 25-34V. Obviously, the sintering and infiltration of silver electrode process of Example 1-10 contributes part of the E10 value, which breaks through the inherent mode that the E10 value of strontium titanate varistor in the prior art only forms in the oxidation process of the substrate.

Figure 2:
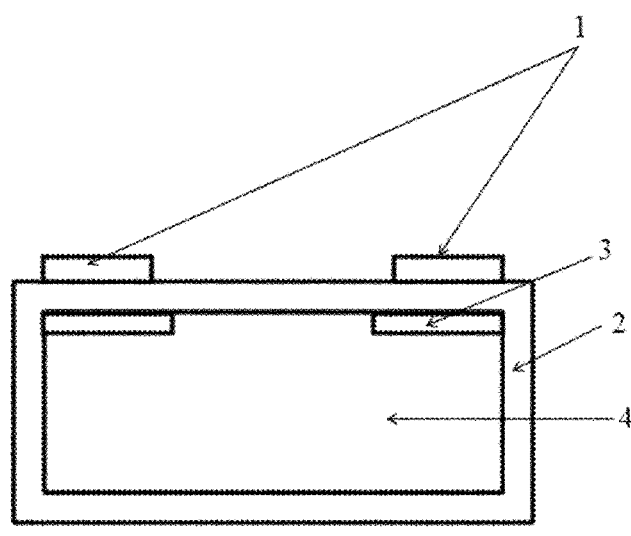
FIG. 2 shows a Masafumi conductive structure model; Masafumi conductive structure model explains the conductive mechanism of strontium titanate ring varistor. The shell structure includes an electrode 1 sintered on the surface of strontium titanate varistor, a surface high resistance layer 2, a grain boundary layer 3, and a semiconductor layer 4 from the outside to the inside in turn. The common feature of semiconductor ceramic production process is that the semiconductor ceramic production process must go through a semiconductor process. The semiconductor process of strontium titanate varistor is carried out by simultaneously doping donor ions such as heterovalent ions $Nb^{5+}$, $Ta^{5+}$, having almost same radius as that of $Ti^{4+}$, $Sr^{2+}$, ions having a valence of five or more, such as $Y^{3+}$, $La^{3+}$, $Bi^{3+}$, positive trivalent ions replace part of the main phase ions, causing defects in the crystal lattice. The oxygen deficiency is formed by sintering in reductive atmosphere. The combined action of reductive atmosphere and donor state jointly form the oxygen vacancy. The oxygen vacancy ionizes to produce free electrons. The composition of the compound deviates from the stoichiometry to reach the semi-conductivity of ceramics. During oxidation sintering, because of the co-doping of the donee such as $Mn^{2+}$ and $Cu^{2+}$, the oxygen diffuses to the surface of strontium titanate due to the excess oxygen, diffuse from the surface, the grain boundary to the internal. The oxygen and the donee state act together to capture the free electrons and the free electrons are consumed, thereby forming a high-resistance insulating layer at the grain boundary, resulting in the double function of potential barrier and capacitance. The high resistance layer of strontium titanate varistor only exists in the surface layer of tens of microns. Masafumi conductive structure model describes the semiconductor mechanism of strontium titanate varistor, from the outside to the inside is the conduction mechanism of the depletion layer, the grain boundary layer and the conduction layer, and the resistance value is the orders of ten kiloohm, ten ohm and ohm. It can be seen that the voltage control of the varistor E10 value comes from the oxidation process of the substrate of the strontium titanate varistor. Related description can be found in master's degree thesis "Strontium titanate ring varistor" dated May 1, 2006 by Liu Haojie from University of Electronic Science and Technology of China (UESTC).

Referring to the Masafumi conductive structure model as shown in FIG. 2, the shell structure includes an electrode 1 sintered on the surface of strontium titanate varistor, a surface high resistance layer 2, a grain boundary layer 3, and a semiconductor layer 4 from the outside to the inside in turn. It can be seen that the voltage control of the varistor E10 value comes from the oxidation process of the substrate of the strontium titanate varistor.

TABLE 4

Comparison of related parameters of substrate oxidation at
high temperature and silver electrode burning-infiltration

|  | substrate oxidation treatment process | | sintering and permeating process of electrode | | Final product voltage |
|---|---|---|---|---|---|
|  | treatment temperature ° C. | treatment time h | treatment temperature ° C. | treatment time min | voltage E10 value V |
| Examples 1-10 | 930 945 | 4.5 9.5 | 820 820 | 40 40 | 17-29 25-34 |
| Comparative example 1 | 945 | 9.5 | 600 | 50 | 16~21 |
| Comparative example 2 | 945 | 9.5 | 830 | 60 | 18~21 |

Note:
the sintering and infiltration process of electrode of comparative example 2 shall be carried out in protective atmosphere.

The above described embodiments are only preferred embodiments of the present invention, and are not intended to limit the scope of the present invention. Any modification, equivalent replacement and improvement within the spirit and principle of the present invention should be included in the protection scope of the present invention.

What is claimed is:

1. A bottom ohmic silver paste for strontium titanate ring varistor, wherein the bottom ohmic silver paste comprises silver powder, doped tin dioxide $SnO_2$ micro powder, glass powder, organic solvent and organic binder, and a mass ratio of the silver powder, the doped tin dioxide $SnO_2$ micro powder, the glass powder, the organic solvent and the organic binder is 65-85:0.9-4.76:0.5-5:10-20:5-15.

2. The bottom ohmic silver paste for strontium titanate ring varistor of claim 1, wherein the doped tin dioxide $SnO_2$ micro powder is tin dioxide $SnO_2$ micro powder doped with one or two of antimony, fluorine, phosphorus and tungsten ions.

3. The bottom ohmic silver paste for strontium titanate ring varistor of claim 1, wherein the doped tin dioxide $SnO_2$ micro powder is doped with $Sb_2O_3$.

4. The bottom ohmic silver paste for strontium titanate ring varistor of claim 1, wherein a mass ratio of tin dioxide $SnO_2$ to dopant in the doped tin dioxide $SnO_2$ micro powder is 89-99:1-11, in which sum of mass ratio of the tin dioxide $SnO_2$ micro powder and the dopant is 100.

5. The bottom ohmic silver paste for strontium titanate ring varistor of claim 1, wherein the doped tin dioxide $SnO_2$ micro powder is spherical and has a median granularity D50 of 0.5-3 μm.

6. The bottom ohmic silver paste for strontium titanate ring varistor of claim 1, wherein the doped tin dioxide $SnO_2$ micro powder has a specific surface area of 2-50 m2/g and a resistivity of 0.1-1 Ω·cm at room temperature.

7. The bottom ohmic silver paste for strontium titanate ring varistor of claim 1, wherein a method for preparing the glass powder comprises the steps of: mixing $H_3BO_3$, $SiO_2$, $BaCo_3$, ZnO, $Al_2O_3$, $Na_2CO_3$, $K_2CO_3$ at a mass ratio of 20-60:15-25:10--20:15-20:1-10:5-20:1-10 via ball milling and obtaining a mixture; melting the mixture at 1250° C. for 2-3 h and obtaining glass slag via water-quenched after melting; placing the glass slag into a ball milling tank and carrying out ball milling for 4-24 h; and obtaining the glass powder with softening point of 635-700° C. and median granularity of D50≤3 μm after sieving and drying.

8. The bottom ohmic silver paste for strontium titanate ring varistor of claim 1, wherein the silver powder comprises a spherical silver powder A having a particle size of 1.0-2.5 μm, a spherical silver powder B having a particle size of 0.8-1.0 μm and a spherical silver powder C having a particle size of 0.2-0.84 μm, and a mass ratio of spherical silver powder A:spherical silver powder B:spherical silver powder C is 30-60:20-30:5-104.

9. A bottom ohmic silver paste for strontium titanate ring varistor of claim 1, wherein a method for preparing the organic binder comprises the steps of: accurately weighing at least one of 80-90 mass parts terpineol and butyl carbitol and adding the terpineol and/or butyl carbitol into a glue making machine, and heating the terpineol and/or butyl carbitol to 80° C.; adding 10-20 mass parts of ethyl cellulose, and controlling the temperature at 90-95° C.; fully stirring the mixture to form a transparent gelatinous mixture; and cooling the mixture naturally to room temperature in a plastic or stainless steel drum, to obtain the organic binder having a viscosity of 400-600 dPa·S.

10. The bottom ohmic silver paste for strontium titanate ring varistor of claim 1, wherein the organic solvent is one or two of terpineol, butyl carbitol, dibutyl phthalate.

11. The bottom ohmic silver paste for strontium titanate ring varistor of claim 1, wherein a method for preparing the bottom ohmic silver paste comprises the steps of: mixing the silver powder, the doped tin dioxide $SnO_2$ micro powder, the glass powder, the organic solvent and the organic binder at a mass ratio of 65-85:0.9-4.76:0.5-5:10-20:5-15 to obtain a mixture; ball milling the mixture and rolling the mixture to obtain the bottom ohmic silver paste.

12. The bottom ohmic silver paste for strontium titanate ring varistor of claim 1, wherein the bottom ohmic silver paste is printed on a surface of a high resistance layer of a strontium titanate substrate having nonlinear volt-ampere characteristics, and the bottom ohmic silver paste is sintered in air at a sintering temperature of 800-860° C.

13. A method for improving easy welding and enduring welding performances of strontium titanate ring varistor comprising the steps of: screen printing a bottom ohmic silver paste on a substrate of strontium titanate ring varistor having volt-ampere characteristics and drying, screen printing surface layer of silver paste in the same position again and drying; sintering the substrate with bottom ohmic silver paste and surface layer of silver paste in the air to form silver electrode, wherein the bottom ohmic silver paste is the bottom ohmic silver paste for strontium titanate ring varistor of claim 1.

14. The method for improving easy welding and enduring welding performances of strontium titanate ring varistor of claim 13, wherein a method for preparing the strontium titanate ring varistor substrate comprises the steps of: mixing $SrCO_3$, $BaCO_3$, $CaCO_3$ and $TiO_2$ proportionally proportioned to obtain a mixture; ball-milling and drying the mixture, to solid-state synthesize strontium barium calcium titanate powder; doping one or more of $Nb_2O_5$, $La_2O_3$, $Ta_2O_5$ and $SiO_2$, $MnCO_3$ to prepare ceramic body of strontium barium calcium titanate ring varistor by ball milling, granulation and molding; and obtaining strontium titanate substrate having nonlinear volt-ampere characteristics by discharging glue, reduction sintering and oxidation sintering.

15. The method for improving easy welding and enduring welding performances of strontium titanate ring varistor of claim 13, wherein the surface layer silver paste is a silver conductive paste having a silver content of 70-80 percentages.

16. A ring varistor with easy welding and enduring welding performances prepared by the method for improving easy welding and enduring welding performances of strontium titanate ring of claim 13.

\* \* \* \* \*